United States Patent
Fu et al.

(10) Patent No.: US 10,411,803 B2
(45) Date of Patent: Sep. 10, 2019

(54) STRONG FILTER COMPENSATION METHOD AND DEVICE, AND COMPUTER STORAGE MEDIUM

(71) Applicant: Sanechips Technology Co., Ltd., Shenzhen, Guangdong (CN)

(72) Inventors: Huajie Fu, Shenzhen (CN); Yantao Gu, Shenzhen (CN)

(73) Assignee: Sanechips Technology Co., Ltd., Shenzhen, Guangdong Province (CN)

( * ) Notice: Subject to any disclaimer, the term of this patent is extended or adjusted under 35 U.S.C. 154(b) by 62 days.

(21) Appl. No.: 15/564,924

(22) PCT Filed: Nov. 11, 2015

(86) PCT No.: PCT/CN2015/094349
§ 371 (c)(1),
(2) Date: Oct. 6, 2017

(87) PCT Pub. No.: WO2016/192310
PCT Pub. Date: Dec. 8, 2016

(65) Prior Publication Data
US 2018/0097566 A1    Apr. 5, 2018

(30) Foreign Application Priority Data
Jun. 4, 2015   (CN) .......................... 2015 1 0304273

(51) Int. Cl.
*H04J 14/02*   (2006.01)
*H04B 10/2507*   (2013.01)
(Continued)

(52) U.S. Cl.
CPC .......... *H04B 10/2507* (2013.01); *H04J 14/02* (2013.01); *G02B 6/2861* (2013.01); *G02F 1/353* (2013.01)

(58) Field of Classification Search
CPC .............................. H04B 10/2507; H04J 14/02
See application file for complete search history.

(56) References Cited

U.S. PATENT DOCUMENTS

| | | | |
|---|---|---|---|
| 7,925,079 B1 * | 4/2011 | Mills .................... | G06K 9/6217 382/159 |
| 2005/0069064 A1 * | 3/2005 | Propp .................... | H03H 17/02 375/350 |

(Continued)

FOREIGN PATENT DOCUMENTS

| CN | 101827045 A | 9/2010 |
|---|---|---|
| CN | 102195903 A | 9/2011 |

(Continued)

OTHER PUBLICATIONS

International Search Report in international application No. PCT/CN2015/094349, dated Feb. 25, 2016, 2 pgs.

(Continued)

*Primary Examiner* — Dzung D Tran
(74) *Attorney, Agent, or Firm* — Li Wu; Stephen Yang; Ling and Yang Intellectual Property

(57) ABSTRACT

Disclosed are a strong filter compensation method and device, and a computer storage medium. The method includes filtering out a high-frequency noise by delay summation; determining a correct path from one or more interference item paths; and comprehensively analyzing the determined correct path for every data input during a pre-set period of time, taking the correct path which has the largest number of occurrences as a final correct path, and outputting data in the path.

11 Claims, 5 Drawing Sheets

(51) Int. Cl.
 *G02B 6/28* (2006.01)
 *G02F 1/35* (2006.01)

(56) References Cited

U.S. PATENT DOCUMENTS

| | | |
|---|---|---|
| 2011/0317674 A1 | 12/2011 | Park |
| 2012/0151247 A1* | 6/2012 | Ferraiolo ................. H04L 1/22 714/4.5 |
| 2012/0224851 A1* | 9/2012 | Takara ............... H04B 10/0793 398/45 |
| 2013/0045016 A1 | 2/2013 | Doran |
| 2013/0287147 A1 | 10/2013 | Ahmed |
| 2014/0289589 A1 | 9/2014 | Jia et al. |

FOREIGN PATENT DOCUMENTS

| | | |
|---|---|---|
| CN | 102243880 A | 11/2011 |
| CN | 102870347 A | 1/2013 |
| CN | 105024757 A | 11/2015 |
| WO | 2010057345 A1 | 5/2010 |

OTHER PUBLICATIONS

English Translation of the Written Opinion of the International Search Authority in international application No. PCT/CN2015/094349, dated Feb. 25, 2016, 7 pgs.
Supplementary European Search Report in European application No. 15893955.3, dated Mar. 22, 2018, 9 pgs.

* cited by examiner

STRONG FILTER COMPENSATION METHOD AND DEVICE, AND COMPUTER STORAGE MEDIUM

TECHNICAL FIELD

The disclosure relates to high-speed data transmission communications and, in particular to, a strong filter compensation method and device in cable dense Wavelength Division Multiplexing (WDM) transmission, and a computer storage medium.

BACKGROUND

During development of a transmission technology, an optical fiber is proved to be an indispensable medium. In view of an exploration about how to transmit the richest information by using a minimum number of optical fibers, the development of light transmission basically goes through the following stages: Space Division Multiplexing (SDM), Time Division Multiplexing (TDM) and WDM.

In the stage of the SDM, the system capacity can only be enlarged by laying a new optical cable or adding new equipment. Thus, time and cost are multiplied in a capacity enlargement process. Therefore, a new replacement method for enlarging the system capacity is found. The TDM once plays a dominant role in system capacity enlargement. Then, since the TDM affects existing services in an upgrade process and is short of flexibility in system upgrade and most importantly, the transmission rate of electronic devices is limited in a high-rate stage particularly 40 G, the system capacity enlargement by the TDM undergoes a ceiling effect. At this time, the system capacity enlargement naturally enters the stage of the WDM. The WDM quickly becomes a mainstream solution for system capacity enlargement due to the characteristics of economy, quickness, maturity and the like.

Even now cable transmission is still dominated by a dense wavelength division system. However, the dense wavelength division system will cause the problems to be solved in a transmission process, such as chromatic dispersion, polarization film dispersion, strong filter effect and the like.

At present, in the industry, the chromatic dispersion is solved by using a filter method, and the polarization film dispersion is solved by using a constant modulus algorithm. However, the strong filter effect does not greatly affect the transmission performance in the stages of 10 G, 40 G and the like. Any effective solution has not been adopted yet in the device.

With the development of a communication technology, an initial 40 G transmission is gradually evolved into 100 G and 400 G transmissions. Meanwhile, a data transmission distance is continuously extended. Thus, the strong filter effect has become a non-ignorable factor for performance influence in the dense wavelength division transmission.

SUMMARY

To solve the abovementioned technical problem(s), an embodiment of the disclosure provides a strong filter compensation method. The method includes the steps as follows.

A high-frequency noise is filtered out by delay summation.

A correct path is determined from one or more interference item paths.

The determined correct path for every data input during a pre-set period of time is comprehensively analyzed, the correct path which has the largest number of occurrences is taken as a final correct path, and data in the path is output.

In the embodiment of the disclosure, the operation that the high-frequency noise is filtered out by the delay summation includes that:

received sampling point data is divided into two paths;
one of the paths of sampling point data is delayed; and
the delayed path of sampling point data and the other path of sampling point data are summated to filter out the high-frequency noise.

In the embodiment of the disclosure, the method further includes:

after one of the paths of sampling point data is delayed, this path of sampling point data is multiplied by a weight parameter; and the operation that the delayed path of sampling point data and the other path of sampling point data are summated includes:

the path of sampling point data multiplied by the weight parameter and the other path of sampling point data are summated.

In the embodiment of the disclosure, the operation that the correct path is determined from one or more interference item paths includes:

data subjected to the delay summation is divided into four paths to calculate four measure results;

the four measure results are divided into two groups and are compared and selected to determine a minimum measure result in each group and a path corresponding to the minimum measure result;

the two minimum measure results are subtracted from each other, and an absolute value is calculated; and the absolute value is stored in a soft bit register group, and the paths corresponding to the minimum measure results, as correct paths, are stored in a preceding state register group.

In the embodiment of the disclosure, the operation that the determined correct path for every data input during the pre-set period of time is comprehensively analyzed, the correct path which has the largest number of occurrences is taken as the final correct path and the data in the path is output includes:

data in the preceding state register group is backtracked to determine a hard decision symbol; and when the hard decision symbol is identical to data in a corresponding soft bit register, a corresponding soft bit value is output, and when the hard decision symbol is different from the data in the corresponding soft bit register, a product of the hard decision symbol and a parameter K is output, wherein K is a configured parameter.

A strong filter compensation device provided by an embodiment of the disclosure includes:

a delay summation module, configured to filter out a high-frequency noise by delay summation;

an optimal path selection module, configured to determine a correct path from one or more interference item paths; and a compensation result judgment output module, configured to comprehensively analyze the determined correct path for every data input during a pre-set period of time, take the correct path which has the largest number of occurrences as a final correct path, and output data in the path.

In the embodiment of the disclosure, the delay summation module includes:

a separation sub-module, configured to divide received sampling point data into two paths;

a delaying sub-module, configured to delay one of the paths of sampling point data; and a summation sub-module, configured to summate the delayed path of sampling point data and the other path of sampling point data to filter out the high-frequency noise.

In the embodiment of the disclosure, the delaying sub-module is further configured to multiply, after one of the paths of sampling point data is delayed, this path of sampling point data by a weight parameter; and the summation sub-module is further configured to summate the path of sampling point data multiplied by the weight parameter and the other path of sampling point data.

In the embodiment of the disclosure, the optimal path selection module includes:

a calculation sub-module, configured to divide data subjected to the delay summation into four paths to calculate four measure results;

a comparison and selection sub-module, configured to divide the four measure results into two groups to be compared and selected so as to determine a minimum measure result in each group and a path corresponding to the minimum measure result;

a subtraction sub-module, configured to subtract the two minimum measure results from each other, and calculate an absolute value; and a storage sub-module, configured to store the absolute value in a soft bit register group, and store the paths corresponding to the minimum measure results, as correct paths, in a preceding state register group.

In the embodiment of the disclosure, the compensation result judgment output module includes:

a backtracking sub-module, configured to backtrack data in the preceding state register group to determine a hard decision symbol; and an output sub-module, configured to output, when the hard decision symbol is identical to data in a corresponding soft bit register, a corresponding soft bit value, and output, when the hard decision symbol is different from the data in the corresponding soft bit register, a product of the hard decision symbol and a parameter K, wherein K is a configured parameter.

A computer storage medium provided by an embodiment of the disclosure stores a computer program, the computer program being used to execute the abovementioned strong filter compensation methods.

In the technical solutions of the embodiments of the disclosure, a strong filter compensation device is divided into a delay summation module, an optimal path selection module, and a compensation result judgment output module. The delay summation module adopts delay summation to filter out influence of a high-frequency noise, but meanwhile, some inter-symbol interference is introduced. The optimal path selection module determines a path having a maximum correct path probability from a plurality of interference item paths, thereby reducing the influence on a channel caused by the inter-symbol interference. The compensation result judgment output module takes a result of every judgment into comprehensive consideration, and finds out the most correct path data to be output. The embodiments of the disclosure removes a strong filter effect by creatively using delay summation instead of direct compensation based on calculation of the influence of the strong filter effect. Although inter-symbol interference is introduced, the problem is redirected to solving of the inter-symbol interference, thereby finally solving the strong filter effect in a line transmission process. This method for indirectly solving the strong filter effect is relatively simple in hardware implementation, and can reduce the wiring complexity, reduce the resource overhead and improve the transmission performance.

DETAILED DESCRIPTION

In order to understand the features and technical contents of the embodiments of the disclosure in more detail, the implementation of the embodiments of the disclosure will be elaborated herein below with reference to the drawings. The accompanying drawings are only used for illustration and reference, but to limit the embodiments of the disclosure.

The technical solutions of the embodiments of the disclosure solve a strong filter effect through three steps: delay summation to solve the influence of a high-frequency noise; optimal path selection to find each correct path having a maximum probability; and compensation result judgment output where correct paths having the maximum probability within a period of time are taken into consideration to determine a final correct path.

Figure 1:
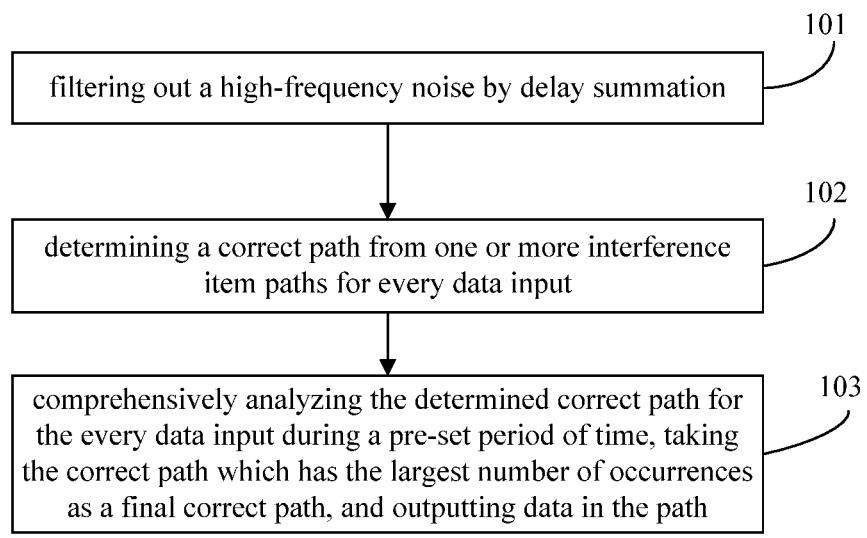
FIG. 1 is a flowchart showing a strong filter compensation method according to an embodiment of the disclosure.

FIG. 1 is a flowchart showing a strong filter compensation method according to an embodiment of the disclosure. As shown in FIG. 1, the strong filter compensation method includes the steps as follows.

In step 101, a high-frequency noise is filtered out by delay summation.

In the embodiment of the disclosure, received sampling point data is divided into two paths. One of the paths of sampling point data is delayed; and the delayed path of sampling point data and the other path of sampling point data are summated to filter out the high-frequency noise.

Figure 2:
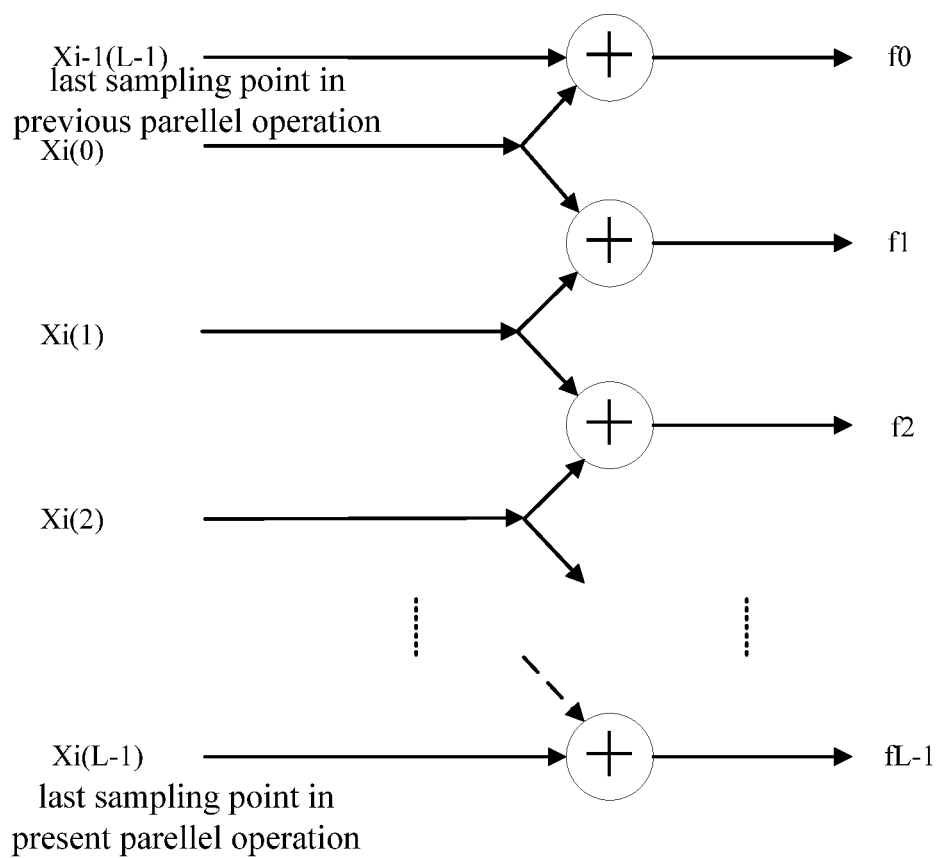
FIG. 2 is a structure diagram illustrating a parallel delay summation part according to an embodiment of the disclosure.

Specifically, the delay summation refers to summation of adjacent sampling points to complete filter-out of a high-frequency noise. During specific implementation, it is supposed that a filter receives L sampling points $Xi(0)$, $Xi(1)$, $Xi(L-1)$, $L \in [0, \infty)$ at each clock period. The last data in L data received by a previous clock period is $Xi-1(L-1)$, and outputs of the filter are $f0$, $f1$, $fL-1$, so $f0=Xi-1(L-1)+Xi(0)$, $f1=Xi(0)+Xi(1)$, $fL-1=Xi(L-2)+Xi(L-1)$. In addition to data of the present clock period, the last sampling point of a previous clock period is needed for calculation of each clock period. In order to reduce an accumulation delay in a parallel operation, data of the last sampling point of the previous clock period is stored. Thus, a rate requirement can be met by adopting a structure as shown in FIG. 2. After power-up initialization or reset of a system, an initial value of the filter may be configurable on line, and may be solidified into a constant value such as the value of a first sampling point $Xi-1(L-1)=0$.

Figure 3:
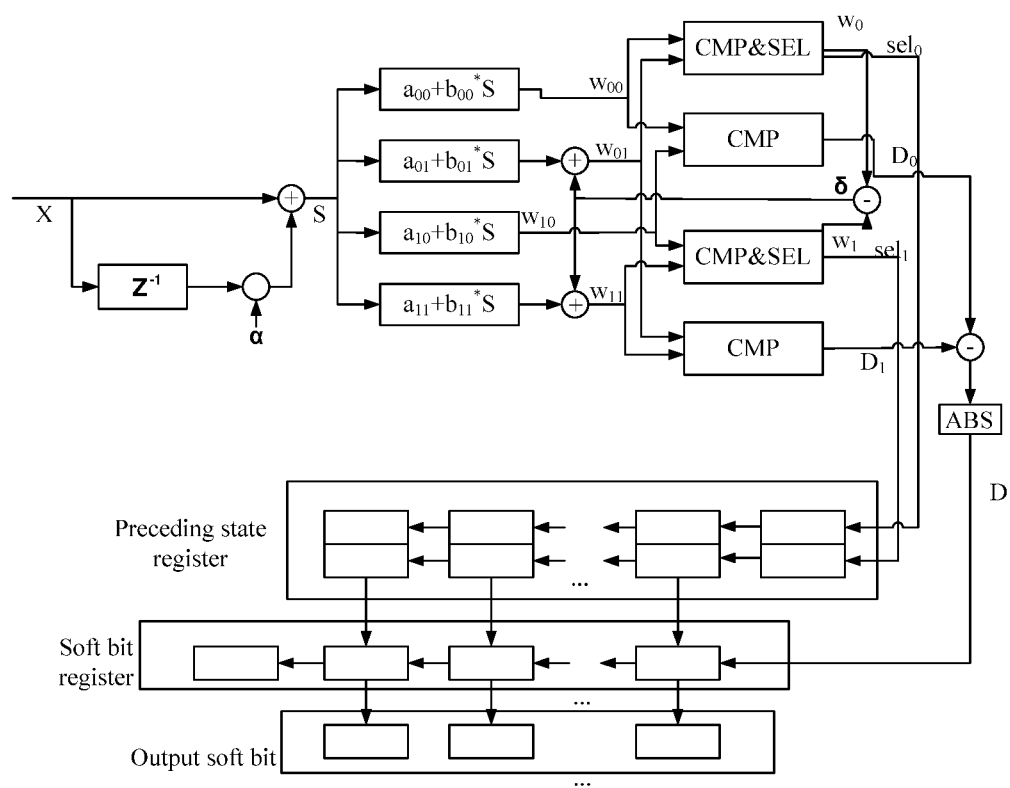
FIG. 3 is a block diagram illustrating a strong filter compensation device according to an embodiment of the disclosure.

In the embodiment of the disclosure, after one of the paths of sampling point data is delayed, this path of sampling point data is multiplied by a weight parameter. Referring to FIG. 3, in the embodiment of the disclosure, the inputted sampling point data is X, X is divided into two paths, one of the paths is subjected to $Z^{-1}$ delaying, and then the delayed sampling point data and the other path of directly-output sampling point data are summated to obtain S. A hardware implementation formula for a delay summation part is: $S_k=(1-a)\cdot X_k+a\cdot X_{k-1}$, where α is a configured parameter, a value range thereof is [0, 1], and a specific configured value is determined according to a channel situation.

In step 102, a correct path is determined from one or more interference item paths.

In the embodiment of the disclosure, data subjected to delay summation is divided into four paths to calculate four measure results; the four measure results are divided into two groups and are compared and selected to determine a minimum measure result in each group and a path corresponding to the minimum measure result; the two minimum measure results are subtracted from each other, and an absolute value is calculated; and the absolute value is stored in a soft bit register group, and the paths corresponding to the minimum measure results are stored in a preceding state register group as correct paths.

Specifically, referring to FIG. 3, after S is calculated by delay summation, four measures are calculated in four paths:

$$W_{00}=\alpha-\beta_{00}\cdot S$$

$$W_{01}=-\alpha-\beta_{01}\cdot S+\delta$$

$$W_{10}=-\alpha-\beta_{10}\cdot S$$

$$W_{11}=\alpha-\beta_{11}\cdot S+\delta$$

$\beta_{00}$, $\beta_{01}$, $\beta_{10}$ and $\beta_{11}$ in the formula are acquired in two ways. In one way which is the same as the way of acquiring α, the parameter is acquired by configuration. In the other way, the parameter is acquired by calculating α. A calculation formula is as follows:

$$\beta_{00}=1+\alpha$$

$$\beta_{01}=1-\alpha$$

$$\beta_{10}=-1+\alpha$$

$$\beta_{11}=-1-\alpha$$

$W_{00}$ and $W_{01}$ are compared and selected, a smaller output is $W_0$, and meanwhile, a selected output is serial number $sel_0$. If $W_0=W_{00}$, $sel_0=0$, and otherwise, $sel_0=1$. Similarly, $W_{10}$ and $W_{11}$ are compared and selected, and $W_1$ and $sel_1$ are outputted.

δ in the above formula is used to calculate next $W_{ij}$, an initial value of δ being 0. It is acquired in two ways. In one way, the parameter is acquired by configuration. In the other way, the parameter is acquired by calculation. A calculation formula is as follows:

$$\delta=W_1-W_0$$

$sel_0$ and $sel_1$ are stored in a preceding state register group and used to output a hard decision symbol during subsequent backtracking.

$W_{00}$ and $W_{10}$ are compared and selected, and a smaller output $D_0$. $W_{01}$ and $W_{11}$ are compared and selected, and a smaller output is $D_1$. A result of $abs(D_1-D_0)$ is stored into a soft bit register group and used to output a soft bit. Here, $abs(D_1-D_0)$ represents calculation of an absolute value for $(D_1-D_0)$.

In step 103, the determined correct path for every data input during a pre-set period of time is comprehensively analyzed, the correct path which has the largest number of occurrences is taken as a final correct path, and data in the path is output.

In the embodiment of the disclosure, data in the preceding state register group is backtracked to determine a hard decision symbol; and when the hard decision symbol is identical to data in a corresponding soft bit register, a corresponding soft bit value is output, and when the hard decision symbol is different from the data in the corresponding soft bit register, a product of the hard decision symbol and a parameter K is output, wherein K is a configured parameter.

Figure 4:
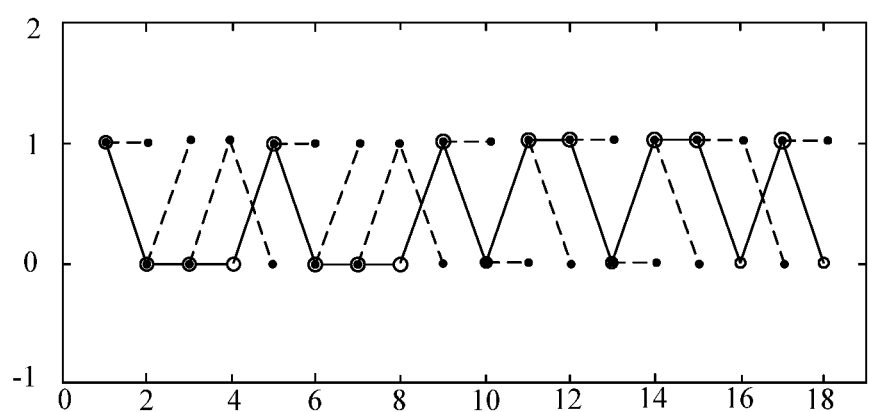
FIG. 4 is a structure diagram illustrating strong filter backtracking according to an embodiment of the disclosure.

Specifically, referring to FIG. 3, after M pieces of initial data are inputted, the preceding state register group will be backtracked every time one piece of data is inputted, and a hard decision symbol at corresponding time is outputted according to a backtracking state. Here, an output hard decision symbol corresponding to a state 0 is −, and an output hard decision symbol corresponding to a state 1 is +. FIG. 4 shows a situation where a preceding state register group with the length of 18 is backtracked. In the figure, a horizontal axis is time, and a longitudinal axis is a state value. Each solid dot in the figure corresponds to a register in the register group, and each dot has a line connected to a dot on the left of this dot, representing a preceding state stored in this register.

When backtracking is started, an initial state is determined according to a current δ value. If δ>0, it is represented that $W_0>W_1$, and backtracking is started from a register into which $sel_0$ is just stored. Otherwise, backtracking is started from a register into which $sel_1$ is just stored.

In backtracking, a preceding state stored in a preceding state register is transferred to at one time. A solid line in FIG. 4 marks a one-time backtracking process. The whole process undergoes (M+1) states. An output hard decision symbol corresponding to a state 0 is − and an output hard decision symbol corresponding to a state 1 is +. Only the leftmost hard decision symbol is outputted, and the following M hard decision symbols are abandoned.

If the hard decision symbol is the same as a correspondingly-stored soft bit symbol, a corresponding soft bit value is outputted. If the symbols are different, the output hard decision symbol is multiplied by a parameter K, K being a configured parameter.

Figure 5:
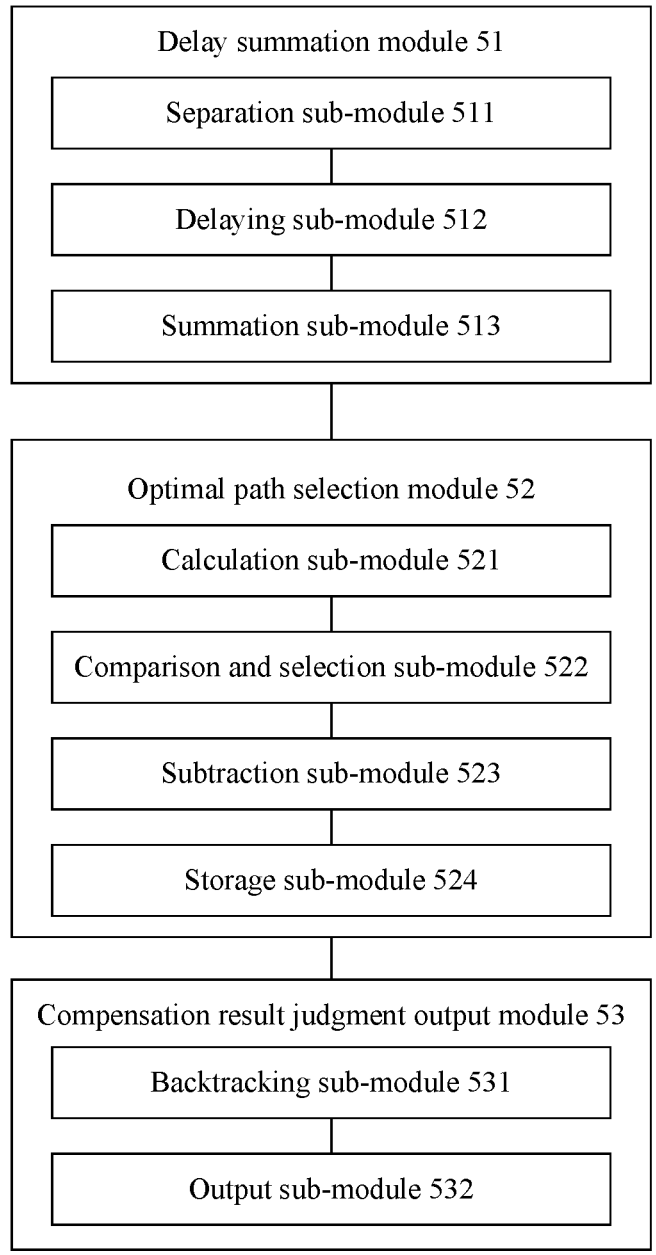
FIG. 5 is a structural diagram illustrating a strong filter compensation device according to an embodiment of the disclosure.

FIG. 5 is a structural diagram illustrating a strong filter compensation device according to an embodiment of the disclosure. As shown in FIG. 5, the device includes:

a delay summation module 51, configured to filter out a high-frequency noise by delay summation;

an optimal path selection module 52, configured to determine a correct path from one or more interference item paths; and a compensation result judgment output module 53, configured to comprehensively analyze the determined correct path for every data input during a pre-set period of time, take the correct path which has the largest number of occurrences as a final correct path, and output data in the path.

In the embodiment of the disclosure, the delay summation module 51 includes:

a separation sub-module 511, configured to divide received sampling point data into two paths;

a delaying sub-module 512, configured to delay one of the paths of sampling point data; and a summation sub-module 513, configured to summate the delayed path of sampling point data and the other path of sampling point data to filter out the high-frequency noise.

In the embodiment of the disclosure, the delaying sub-module 512 is further configured to multiply, after one of the paths of sampling point data is delayed, this path of sampling point data by a weight parameter; and the summation sub-module 513 is further configured to summate the path of sampling point data multiplied by the weight parameter and the other path of sampling point data.

In the embodiment of the disclosure, the optimal path selection module 52 includes:

a calculation sub-module 521, configured to divide data subjected to delay summation into four paths to calculate four measure results;

a comparison and selection sub-module 522, configured to divide the four measure results into two groups to be compared and selected so as to determine a minimum measure result in each group and a path corresponding to the minimum measure result;

a subtraction sub-module 523, configured to subtract the two minimum measure results from each other, and calculate an absolute value; and a storage sub-module 524, configured to store the absolute value in a soft bit register group, and store the paths corresponding to the minimum measure results, as correct paths, in a preceding state register group.

In the embodiment of the disclosure, the compensation result judgment output module 53 includes:

a backtracking sub-module 531, configured to backtrack data in the preceding state register group to determine a hard decision symbol; and an output sub-module 532, configured to output, when the hard decision symbol is identical to data in a corresponding soft bit register, a corresponding soft bit value, and output, when the hard decision symbol is different from the data in the corresponding soft bit register, a product of the hard decision symbol and a parameter K, wherein K is a configured parameter.

A person skilled in the art should understand that implementation functions of each unit and sub-units thereof in the strong filter compensation device as shown in FIG. 5 may be understood with reference to relevant description for the aforementioned strong filter compensation method. Functions of each unit and sub-units thereof in the strong filter compensation device as shown in FIG. 5 may be implemented by a program running on a processor or may be implemented by a specific logic circuit.

In practical application, each unit module in the strong filter compensation device may be implemented by a Central Processing Unit (CPU), or a Digital Signal Processor (DSP), or a Field-Programmable Gate Array (FPGA).

If being implemented in a form of software function module and sold or used as an independent product, the abovementioned service signaling tracking device in the embodiment of the disclosure may also be stored in a computer-readable storage medium. Based on such understanding, the technical solutions of the embodiments of the disclosure substantially or parts making contributions to the conventional art may be embodied in form of software product, and the computer software product is stored in a storage medium, including a plurality of instructions used to enable a computer device (which may be a personal computer, a server, network equipment or the like) to execute all or part of the method in each embodiment of the disclosure. The abovementioned storage medium includes: various media capable of storing program codes such as a U disk, a mobile hard disk, a Read-Only Memory (ROM), a magnetic disk or an optical disk. Thus, the embodiments of the disclosure are not limited to combination of any specific hardware and software.

Correspondingly, the embodiments of the disclosure also provide a computer storage medium in which a computer program is stored, the computer program being used to execute the strong filter compensation methods in the embodiments of the disclosure.

The technical solutions provided in the embodiments of the disclosure may be randomly combined without conflicts.

In some embodiments provided by the disclosure, it should be understood that the disclosed method and intelligent equipment may be implemented in another manner. The equipment embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the equipment or the units, and may be electrical and mechanical or adopt other forms.

The abovementioned units described as separate parts may or may not be physically separated, and parts displayed as units may or may not be physical units, and namely may be located in the same place, or may also be distributed to multiple network units. Part or all of the units may be selected to achieve the purpose of the solutions of the embodiment according to a practical requirement.

In addition, each function unit in each embodiment of the disclosure may be integrated into a second processing unit, each unit may also exist independently, and two or more than two units may also be integrated into a unit. The abovementioned integrated unit may be implemented in a form of hardware, and may also be implemented in a form of hardware and software function unit.

The above is only the specific implementation manners of the disclosure, but the scope of protection of the disclosure is not limited to this. As will occur to any person skilled in the art, the disclosure is susceptible to changes or replacements within the disclosed technical scope. These changes or replacements should fall within the scope of protection of the disclosure.

The invention claimed is:

1. A strong filter compensation method, comprising:
   filtering out a high-frequency noise by delay summation;
   determining a correct path from one or more interference item paths for every data input; and
   comprehensively analyzing the determined correct path for the every data input during a pre-set period of time, taking the correct path which has the largest number of occurrences as a final correct path, and outputting data in the path.

2. The strong filter compensation method according to claim 1, wherein filtering out the high-frequency noise by the delay summation comprises:
   dividing received sampling point data into two paths;
   delaying one of the paths of sampling point data; and
   summating the delayed path of sampling point data and the other path of sampling point data to filter out the high-frequency noise.

3. The strong filter compensation method according to claim 2, further comprising:

after one of the paths of sampling point data is delayed, multiplying the path of sampling point data by a weight parameter,
wherein summating the delayed path of sampling point data and the other path of sampling point data comprises:
summating the path of sampling point data multiplied by the weight parameter and the other path of sampling point data.

4. The strong filter compensation method according to claim 1, wherein determining the correct path from one or more interference item paths comprises:
dividing data subjected to the delay summation into four paths to calculate four measure results;
dividing the four measure results into two groups to be compared and selected so as to determine a minimum measure result in each group and a path corresponding to the minimum measure result;
subtracting the two minimum measure results from each other, and calculating an absolute value; and
storing the absolute value in a soft bit register group, and storing the paths corresponding to the minimum measure results, as correct paths, in a preceding state register group.

5. The strong filter compensation method according to claim 4, wherein the step of comprehensively analyzing the determined correct path for the every data input during the pre-set period of time, taking the correct path which has the largest number of occurrences as the final correct path and outputting the data in the path comprises:
backtracking data in the preceding state register group to determine a hard decision symbol; and
when the hard decision symbol is identical to data in a corresponding soft bit register, outputting a corresponding soft bit value, and when the hard decision symbol is different from the data in the corresponding soft bit register, outputting a product of the hard decision symbol and a parameter K, K being a configured parameter.

6. A strong filter compensation device, comprising:
a processor; and
a memory configured to storing instructions executable by the processor to filter out a high-frequency noise by delay summation;
determine a correct path from one or more interference item paths; and
comprehensively analyze the determined correct path for every data input during a pre-set period of time, take the correct path which has the largest number of occurrences as a final correct path, and output data in the path.

7. The strong filter compensation device according to claim 6, wherein the processor is further configured to divide received sampling point data into two paths;
delay one of the paths of sampling point data; and
summate the delayed path of sampling point data and the other path of sampling point data to filter out the high-frequency noise.

8. The strong filter compensation device according to claim 7, wherein the processor is further configured to multiply, after one of the paths of sampling point data is delayed, the path of sampling point data by a weight parameter; and
summate the path of sampling point data multiplied by the weight parameter and the other path of sampling point data.

9. The strong filter compensation device according to claim 6, wherein the processor is further configured to divide data subjected to the delay summation into four paths to calculate four measure results;
divide the four measure results into two groups to be compared and selected so as to determine a minimum measure result in each group and a path corresponding to the minimum measure result;
subtract the two minimum measure results from each other, and calculate an absolute value; and
store the absolute value in a soft bit register group, and store the paths corresponding to the minimum measure results, as correct paths, in a preceding state register group.

10. The strong filter compensation device according to claim 6, wherein the processor is further configured to backtrack data in the preceding state register group to determine a hard decision symbol; and
output, when the hard decision symbol is identical to data in a corresponding soft bit register, a corresponding soft bit value, and output, when the hard decision symbol is different from the data in the corresponding soft bit register, a product of the hard decision symbol and a parameter K, K being a configured parameter.

11. A non-transitory computer storage medium having computer-executable instructions stored, wherein the computer-executable instructions are configured to execute a strong filter compensation method, wherein the method comprises:
filtering out a high-frequency noise by delay summation;
determining a correct path from one or more interference item paths for every data input; and
comprehensively analyzing the determined correct path for the every data input during a pre-set period of time, taking the correct path which has the largest number of occurrences as a final correct path, and outputting data in the path.

* * * * *